Figure 1:
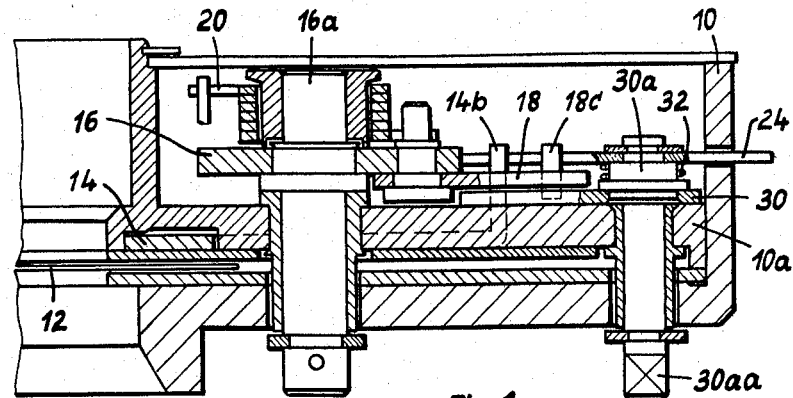

March 29, 1966     F. SINGER ETAL     3,242,838
PHOTOGRAPHIC SHUTTER
Filed Oct. 14, 1963     2 Sheets-Sheet 1

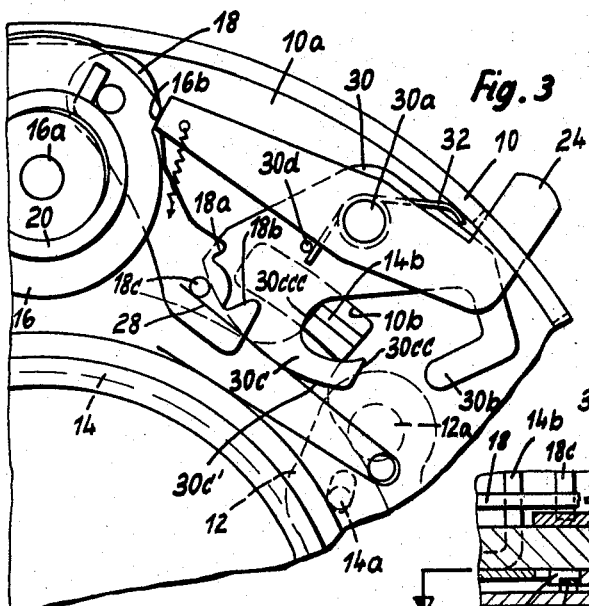
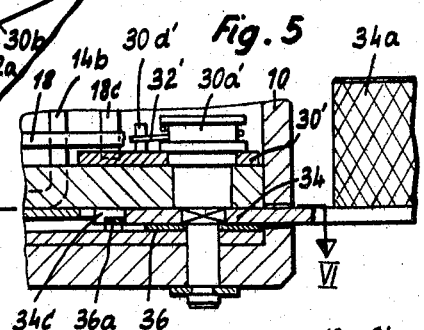
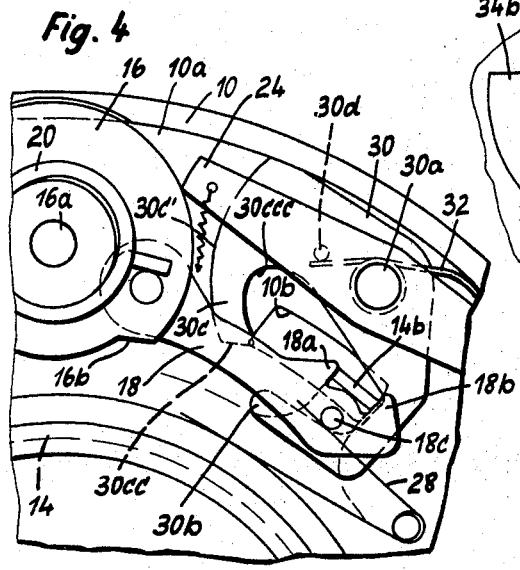
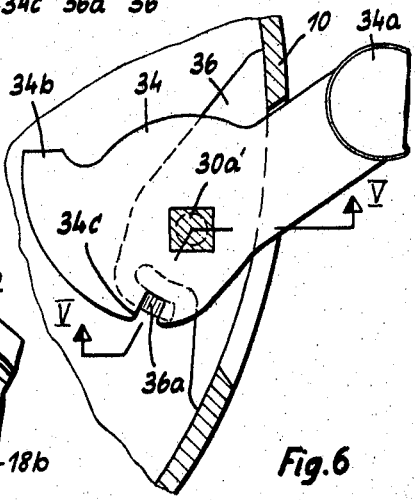

United States Patent Office 3,242,838
Patented Mar. 29, 1966

3,242,838
PHOTOGRAPHIC SHUTTER
Franz Singer and Bernhard Euthum, Munich, Germany, assignors to Compur-Werk Gesellschaft mit beschrankter Haftung & Co., Munich, Germany, a firm of Germany
Filed Oct. 14, 1963, Ser. No. 315,841
Claims priority, application Germany, Oct. 25, 1962, C 28,270
5 Claims. (Cl. 95—42)

The present invention relates to a photographic shutter wherein means is provided for opening and closing the shutter independently of the main operating member and crank which actuate the shutter during exposure. Such means disengages the crank from the shutter blade driving ring during the movement thereof from a rest to a shutter open position. The shutter opening means further provides an abutment for the crank in the zone of its reversal of movement while the shutter is opening and closing during exposure, thereby insuring proper movement of the crank.

In reflex cameras or in studio cameras utilizing ground glass inspection plates means must be provided for opening the shutter to permit interim inspection of the subject being photographed prior to exposure. In accordance with the present invention there is provided an opening member which is pivotally mounted in the shutter housing. This opening member is provided with a pair of arms, one of which is adapted to engage the blade driving ring to open the shutter. The main operating member which rotates to open and close the shutter during exposure is coupled to the blade driving ring by a crank having a projection thereon. The projection on the crank is engageable with an arm on the opening member so that the crank is moved out of engagement with the blade driving ring when the opening member is moved from a rest to a shutter open position. When the opening member is at the rest position thereof one of the arms of the opening member is so positioned as to engage the projection on the crank when the crank is driven by the main operating member to the point of reversal of movement of the crank and this engagement insures maintenance of engagement of the crank with the blade opening ring and proper movement of the crank.

In an embodiment of the invention specifically for use with a single lens reflex type camera, the opening member may be mounted on a shaft which is disposed parallel to the optical axis of the camera and this shaft extends outwardly of the shutter housing and may be coupled with the camera mechanism which operates the mirror so that, after the mirror is brought into viewing position, the shutter is opened by the opening member.

In another embodiment of the invention specifically for use with a studio camera having ground glass inspection the opening member is connected to a shaft in the shutter housing and is disposed parallel to the optical axis. A manually operable lever mounted on this shaft extends from the housing and movement of this lever shifts the opening member between rest and open positions. A spring may be provided to urge the opening member to the rest position thereof and a resilient detent means may be associated with the lever to hold the lever in the shutter open position.

The opening means disclosed herein requires only a relatively few parts and occupies a minimum space. The opening member performs a dual function, it serves to open the shutter to provide for interim inspection while disengaging the exposure operating means, and it serves as a means for retaining the crank in engagement with the blade driving means while the shutter is being opened and closed during exposure.

An object of the present invention is to provide for a camera a shutter opening member which disengages the crank from the blade driving ring when the member moves the blade driving ring to shutter open position and which provides abutment means for the crank when the shutter is opened and closed by the crank and main operating member.

Another object of the present invention is to provide a shutter opening member for a camera, said opening member having a pair of spaced arms, one of said arms adapted to engage a projection on the crank to disengage the crank from the blade driving ring when the opening member is moved from a rest to an open position, the other of said arms providing an abutment for a projection on the crank when the crank is driven by the main operating member to the point of reversal of movement during opening and closing of the shutter.

Figure 2:
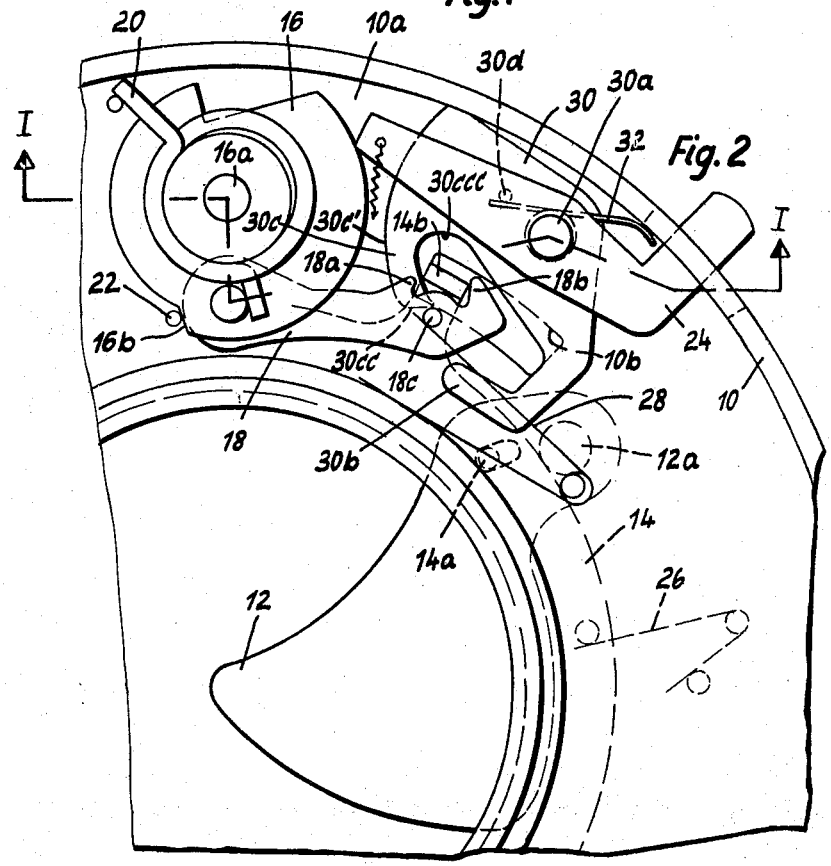

Further features of the invention are set forth in the following specific description of embodiments thereof illustrated in the accompanying drawings, in which:

FIGURE 1 is a shutter seen in partial cross section on the line I—I of FIGURE 2, FIGURES 2 to 4 are plan views of a section of the shutter seen in different operating positions, FIGURE 5 illustrates a further embodiment of the opening apparatus in cross section on the line V—V of FIGURE 6, and FIGURE 6 is a plan view of the same, taken on the line VI—VI of FIGURE 5.

The shutter illustrated in FIGURES 1 to 4 is a blade-provided shutter of a kind known per se, having its mechanisms installed in a shutter housing 10. There are, for example, five shutter blades 12 which are fixedly mounted at 12a and are operated by driving pins 14a of a blade driving ring 14 so as to perform a reciprocal movement for the purpose of opening and closing the objective aperture. The blade driving ring is in turn driven by a main driving member 16 through a crank 18 which is pivotally coupled to the main driving member and which cooperates with an upwardly turned end of an arm 14b of the blade driving ring 14. The turned up arm 14b passes upwards through a radial limiting slot 10b in the base plate 10a of the shutter, a spring 26 being provided to hold the blade driving ring 14 in the rest position when the blades are closed. The main driving member 16 has a cocking shaft 16a which projects rearwards out of the shutter housing and which is adapted to be coupled to the film feed and mirror control device (not shown) of a single lens reflex camera. There is provided a driving spring 20 for member 16 which seeks to move the main driving member in the clockwise direction. The rest position of the main driving member which is indicated in FIGURE 2, is determined by a stationary stop pin 22 which bears against the nose 16b of the main driving member. A shutter release lever 24 also cooperates with the nose 16b of the main driving member in the cocked position (FIGURE 3). The crank 18 has two crank arms 18a, 18b and a projecting pin 18c whose function will be described in more detail later. A hairpin spring 28, one end of which bears against the projection 18c of the crank 18, is arranged to hold the crank in engagement with the arm 14b of the blade driving ring.

There is also an opening lever 30 provided with two trapper arms which is mounted fixedly on the opening shaft 30a, the shaft being rotatably mounted in the shutter housing 10. The rear end of the shaft which projects out of the shutter housing 10 is square ended, as at 30aa, and is there adapted to be coupled to the film feed and mirror-control device of the camera. One of these trapper arms is designated 30b and the other 30c. The latter arm has an operative face 30c' and an end face 30cc and defines a curved recess 30ccc. A return spring 32 is mounted on the opening shaft and this spring bears at one end against the shutter housing 10 and at the other end against a pin 30d of the opening lever 30b and biases the latter into its rest position.

The embodiment described operates as follows:

When the user wishes to take a picture, the shutter is brought from the rest position of FIGURE 2 into the cocked position of FIGURE 3. To this end, the setting lever of the camera (not shown) is moved, so that the film feed, the pivoting-in of the mirror and the tensioning of the shutter, are effected in a well-known manner. This system is so arranged that the reflex mirror is pivoted into the observation position, together with the feed of the film, in the initial phase of the tensioning of the camera. Then the coupled opening shaft 30a and the opening lever 30 begin to move in the counterclockwise direction and against the action of spring 32, the end 30cc of the trapper arm 30c pressing against the pin 18c of the crank 18, and releasing the entraining connection between the same and the blade driving ring 14. After this disengagement, the arm 14b of the blade driving ring 14 passes into the inner recess 30ccc behind the trapper arm 30c of the lever 30, and thus into entraining connection with the latter, so that the blade driving ring is moved in the clockwise direction. Consequently, the shutter blades 12 are brough by the trapper arm 30c of the opening lever 30 from their closed position into the open position (FIGURE 3) during the setting of the camera.

During the further course of the camera setting, the cocking shaft 16a and the main driving member 16 are moved in a counterclockwise direction and against the action of the driving spring 20 into the cocked position, the shutter release lever 24 being located in front of the nose 16b of the main driving member and holding it in the cocked position (FIGURE 3).

The user can now observe his subject through the mirror reflex device, and if desired, can make a correction of the setting values, the exposure period, the diaphragm aperture and the distance. After setting all these factors, the camera is ready for the exposure.

If now the user operates the camera trip (not shown), the opening shaft 30a and the opening lever 30 are first turned back in the clockwise direction under the control of the camera mechanism. At the same time the arm 14b of the blade driving ring 14 follows this movement under the action of spring 26 and the ring 14 rotates back in the counterclockwise direction until it reaches its rest or abutment position, the shutter blades 12 reclosing. In the rest position of the opening lever 30, the entraining engagement between the trapper arm 30c and the arm 14b is broken, whereby the driving connection between the arm 14b of the blade driving ring and the crank 18 is restored by the action of the hairpin spring 28.

The reflex-mirror of the camera is then brought into the out-of-the-way position by the mechanism of the camera. After this running-down movement, a member (not shown) in the camera engages the shutter release lever 24 and pivots the latter in clockwise direction, so that the main driving member 16 of the shutter is free to run down. As a result of the action of its spring 20, it moves out of the cocked position (FIGURE 3) in the clockwise direction towards the rest position. During this run-down movement of the main driving member 16, which covers an angular span of about 150°, the crank 18 is first moved to the right, the opening lever 30 being stationary, and crank arm 18a moves the arm 14b of the blade driving ring in the clockwise direction so as to open the shutter blades 12 (FIGURE 4). At this phase of the operation, the trapper arm 30b of the opening lever 30 which is in the rest position, provides an abutment for the crank projection 18c in the vicinity of the point of reversal of movement of the crank 18 and that of the blade ring 14. This has the advantage of maintaining the positive engagement between the arm 14b of the blade driving ring 14 and the crank 18 which engagement might otherwise be broken in view of the powerful force components developed by the main driving means at the time of reversal of movement, and in view of the fact that spring 28 is relatively weak.

In the further phase of the run-down movement of the main driving member the crank 18 is again moved to the left, as a result of which its other crank arm 18b moves the arm 14b of the blade driving ring in the counterclockwise direction so as to close the shutter blades back into the rest position. The opening lever 30 described above, and constructed in accordance with this invention, thus advantageously performs two functions, namely the actual opening of the shutter blades for interim inspection and also the maintenance of the crank in engagement with the blade driving member. Its use is, however, not restricted solely to the embodiment illustrated with a single lens reflex camera, but can also be applied to shutters for other cameras, as for example that illustrated in the embodiment which now follows.

In this second embodiment, illustrated in FIGURES 5 and 6, the shutter equipped with an opening lever, is applied to a studio camera with provision for ground glass inspection, the opening lever being manually operable to allow for the interim inspection. For this purpose, there is provided an operating lever 34 with a handle 34a projecting out from the housing of the shutter, this lever being firmly connected to pin 30a' which is rotatably mounted within housing 10. The opening lever 30' is also fixedly coupled with this pin inside the housing. The opening lever corresponds to that described in the preceding example, both with respect to its shape and its method of functioning. The return spring 32' of the opening lever 30' strives to maintain the manual operating lever 34 in the rest position when the blades are closed. In this case, a projection 34b of the operating lever 34 is applied against the inner face of the shutter housing 10. Disposed beneath the operating lever 34 is a leaf spring 36 which surrounds a bearing pin 30a' and bears against the inner face of the housing 10. This leaf spring has a lug 36a which projects in the axial direction of the shutter to form an abutment and this can engage in a notch 34c of the operating lever 34, so as to form a detent when the blades are open. When the shutter is to be opened for interim inspection, the operating lever 34 is moved by hand from its rest position, and in the counterclockwise direction, into the position illustrated in FIGURE 6, the resilient detent 36a of the leaf spring 36 then engaging in the notch 34c of lever 34 and holding the same in the interim inspection position. The opening lever 30' is, at the same time, positively impelled in this rotary movement so that, as in the first embodiment, its trapper arm 30c entrainingly connected to the arm 14b of the blade driving ring 14 to move the latter in the clockwise direction, the shutter blades then being fully opened for the interim inspection.

As soon as this inspection of the photographed subject on the ground glass is finished and the shutter is to be closed again, it is only necessary to press lightly on the operating lever 34 until the resilient locking lug 36a is depressed. Then the operating lever 34 as well as the opening lever 30' travel back to their rest position under the action of the return spring 32, the shutter being closed in the manner already referred to. An exposure can now be performed by operating the shutter trip (not shown). In this event, the trapper arm 30b of the opening lever 30' again provides an abutment for the projection 18c of the crank 18 at the time of the reversal of its travel.

The shutter release lever (not shown) in this embodiment is not mounted on the same shaft as the manually operated lever 34, so as to avoid confusion in operation of the two levers. Furthermore, a locking device (not shown) may be installed between the trip lever 24 and the operating lever 34 in such a way that it is impossible to produce a pivotal movement of the shutter trip lever at the time that the operating lever 34 is turned into the interim inspection position. This prevents the trip being actuated during the interim inspection and with the blades opened, thus making it foolproof. The opening lever constructed in accordance with this invention may, for example, be coupled with the mirror control device of a single lens reflex camera having an immediate return of the mirror.

Obviously, many modifications and variations of the present invention are possible in the light of the above teachings. What is claimed as new and is desired to be secured by Letters Patent is:

1. A photographic shutter comprising a plurality of pivoted shutter blades, a blade driving ring operatively connected to said shutter blades and mounted for reciprocation to open and close the blades, a crank operatively connected to said blade driving ring and adapted to reciprocate said ring, and an opening member pivotally mounted for movement between a rest position and an operative position, said opening member including a first and a second arm, whereby in the rest position of said opening member the first arm partly lies along the path of the movement of said crank to provide an abutment maintaining said crank in engagement with said driving ring at least at the point of reversal movement of said crank and said driving ring, said second arm comprising a disengaging surface cooperating with said crank and an engaging surface cooperating with said driving ring, both surfaces acting during the movement of the opening member from the rest position to the operating position to disengage said crank from engagement with said driving ring, and to move the driving ring to the open position of the shutter blades.

2. A photographic shutter according to claim 1, said shutter being disposed in a housing and used with a reflex camera having a pivotal mirror, and further including a shaft mounting said opening member, said shaft being parallel to the optical axis of the camera, said shaft projecting from the shutter housing and adapted to be coupled to the camera mechanism for operating the mirror.

3. A photographic shutter according to claim 1, said shutter being disposed in a housing and used with a camera provided with ground glass inspection means and further including a shaft rotatably mounted in said housing and disposed parallel to the optical axis of the camera, and a manually operable setting lever secured to said shaft and projecting from said housing, said opening member being fixedly mounted on said shaft.

4. A photographic shutter according to claim 3 and further including a return spring to urge said opening member to the rest position and spring detent means to retain said opening member in the opening position thereof.

5. A photographic shutter for a camera, comprising a housing for said shutter, a plurality of shutter blades pivotally mounted in said housing, a blade driving ring rotatable in said housing, said blade driving ring being connected to said blades to move the blades between open and closed positions thereof, a main operating member, a crank pivotally connected to said main operating member, a driving arm on said blade driving ring, a bifurcated end portion of said crank engageable with said driving arm whereby upon rotation of said main operating member said crank reciprocates said blade driving ring to open and close the shutter, an opening member pivoted mounted in said housing, said opening member having a pair of spaced arms thereon, said opening member adapted to engage said driving arm and rotate the blade driving ring to open the shutter when said opening member is moved from a rest to an opening position, a projection on said crank, a first one of said pair of arms on said opening member engageable with said projection and adapted to pivot said crank out of engagement with said driving arm when the opening member is moved from a rest to an opening position, a second one of said pair of arms providing an abutment for said crank projection at the point of reversal of movement of said crank during opening and closing of the shutter by the crank when said opening member is at the rest position to assist in maintaining said crank in engagement with the blade driving ring.

References Cited by the Examiner
UNITED STATES PATENTS
2,949,075   8/1960   Rentichter _____ 95—63

JOHN M. HORAN, *Primary Examiner.*